(12) United States Patent
Tijink

(10) Patent No.: US 11,145,195 B2
(45) Date of Patent: *Oct. 12, 2021

(54) SERVICE STATION FOR AN INTELLIGENT TRANSPORTATION SYSTEM

(71) Applicant: Kapsch TrafficCom AG, Vienna (AT)

(72) Inventor: Jasja Tijink, Breitenfurt (AT)

(73) Assignee: Kapsch TrafficCom AG, Vienna (AT)

(*) Notice: Subject to any disclaimer, the term of this patent is extended or adjusted under 35 U.S.C. 154(b) by 0 days.

This patent is subject to a terminal disclaimer.

(21) Appl. No.: 16/928,640

(22) Filed: Jul. 14, 2020

(65) Prior Publication Data

US 2021/0020032 A1    Jan. 21, 2021

(30) Foreign Application Priority Data

Jul. 17, 2019  (EP) .................................... 19186792

(51) Int. Cl.
| | |
|---|---|
| *G08G 1/01* | (2006.01) |
| *G06F 7/14* | (2006.01) |
| *G06K 9/00* | (2006.01) |
| *G06K 9/62* | (2006.01) |
| *G06Q 50/30* | (2012.01) |

(52) U.S. Cl.
CPC ............. *G08G 1/0116* (2013.01); *G06F 7/14* (2013.01); *G06K 9/00785* (2013.01); *G06K 9/6288* (2013.01); *G06Q 50/30* (2013.01); *G08G 1/0141* (2013.01); *G06K 9/00791* (2013.01)

(58) Field of Classification Search
CPC ............... G08G 1/0116; G08G 1/0141; G06K 9/00785; G06K 9/6288; G06Q 50/30
USPC ........................................................ 340/937
See application file for complete search history.

(56) References Cited

U.S. PATENT DOCUMENTS

| | | | |
|---|---|---|---|
| 2018/0307245 A1 | 10/2018 | Khawaja et al. | |
| 2018/0365909 A1* | 12/2018 | Cheng | G07C 5/008 |
| 2019/0068639 A1* | 2/2019 | Alexander | H04W 4/46 |

(Continued)

FOREIGN PATENT DOCUMENTS

EP    3462754 A1    4/2019

OTHER PUBLICATIONS

Extended European Search Report received for European Patent Application No. 19186792.8, dated Jan. 8, 2020, 8 pages.

(Continued)

*Primary Examiner* — Kerri L McNally
(74) *Attorney, Agent, or Firm* — Fiala & Weaver P.L.L.C.

(57) ABSTRACT

An Intelligent Transportation System, ITS, service station is disclosed. The ITS service station has: a receiver having an area of radio coverage and configured to receive a first Collective Perception Message, CPM, from a first ITS station at a first position within the coverage area, the first CPM including first sensor data on at least one first free space area perceived by the first ITS station; an aggregator configured to aggregate said first sensor data with at least one second sensor data on at least one second free space area into a third sensor data, which second sensor data is received via the receiver in a second CPM from a second ITS station at a second position within the coverage area or is determined by a sensor of the ITS service station; and a transmitter configured to broadcast said third sensor data in a third CPM.

20 Claims, 6 Drawing Sheets

(56) References Cited

U.S. PATENT DOCUMENTS

2019/0098088 A1* 3/2019 Baltar .................... H04L 67/12
2019/0221110 A1* 7/2019 Vanderveen .......... G01S 5/0072

OTHER PUBLICATIONS

Intelligent Transport Systems (ITS); Vehicular Communications; Basic Set of Applications; Analysis of the Collective Perception Service (CPS), ETSI TR 103 562 V0.0.16, Jun. 2019, pp. 1-105.

* cited by examiner

SERVICE STATION FOR AN INTELLIGENT TRANSPORTATION SYSTEM

CROSS-REFERENCE TO RELATED APPLICATION(S)

This application claims priority to European Patent Application No. 19 186 792.8, filed on Jul. 17, 2019, the entirety of which is incorporated by reference herein.

BACKGROUND

Technical Field

The present disclosed subject matter relates to a service station for an Intelligent Transportation System (ITS)

Background Art

The basic ITS communication architecture is described in ETSI (European Telecommunications Standards Institute) Standard EN 302 665 and related ETSI standards. A most recent development in ITS is the so-called Collective Perception Service (CPS) to share information on objects detected by one communication partner, such as a vehicle onboard unit (OBU) or a roadside unit (RSU) (generally called "ITS station", ITS-S), with another communication partner (ITS-S). The CPS in ITS is described in, e.g., ETSI Technical Report TR 103 562 and ETSI Technical Specification TS 103 324.

Figure 1C:
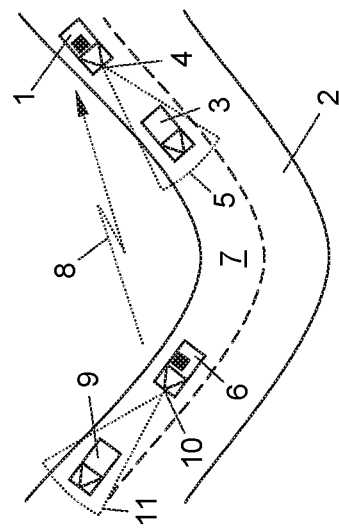
Figure 1B:
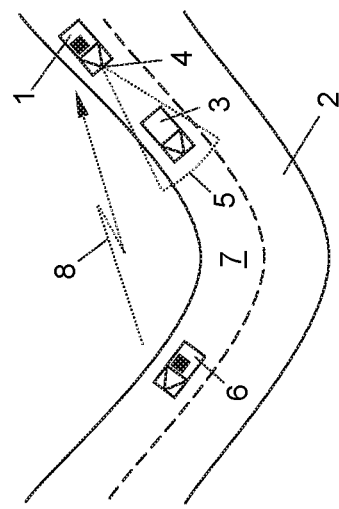
Figure 1A:
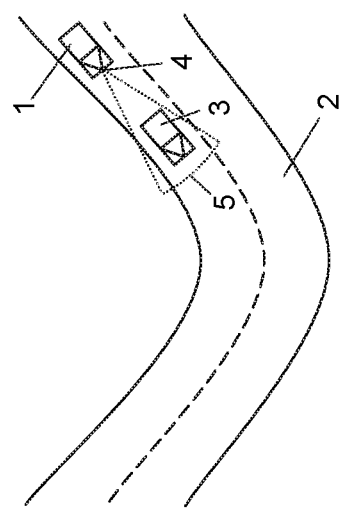

FIGS. 1a-1c show the present concept of CPS to share "perceptions" (detections, analysis and/or trackings) of objects among participants according to the above-mentioned ETSI standards. In FIG. 1a a vehicle 1 on a road 2 perceives an object 3, e.g., another vehicle, by means of an own sensor 4 such as a camera, a radar sensor, lidar sensor etc., with a field of view 5. In FIG. 1b the vehicle 1 may be additionally aware of a third vehicle 6 around a bend 7 of the road 2 which obstructs the direct view to the vehicle 6, by means of a wireless communication 8 between an ITS-S aboard the vehicle 6 and an own ITS-S aboard the vehicle 1. In FIG. 1c the third vehicle 6 around the bend 7 perceives a fourth vehicle 9 by means of an own sensor 10 with a field of view 11 and shares information about this perception over the wireless communication 8 with the first vehicle 1. Vehicle 1 thus enjoys the benefit of a "Collective Perception" (CP) from other ITS-S-equipped participants so that it becomes aware of objects beyond its own sensor range even when those objects are not equipped with an ITS-S on their own.

Similarly to the perception of objects the CPS standardized in ETSI TR 103 562 also provides for the sharing of information on free space areas a participant may move into, for example for collision avoidance or maneuvering.

Figure 2:
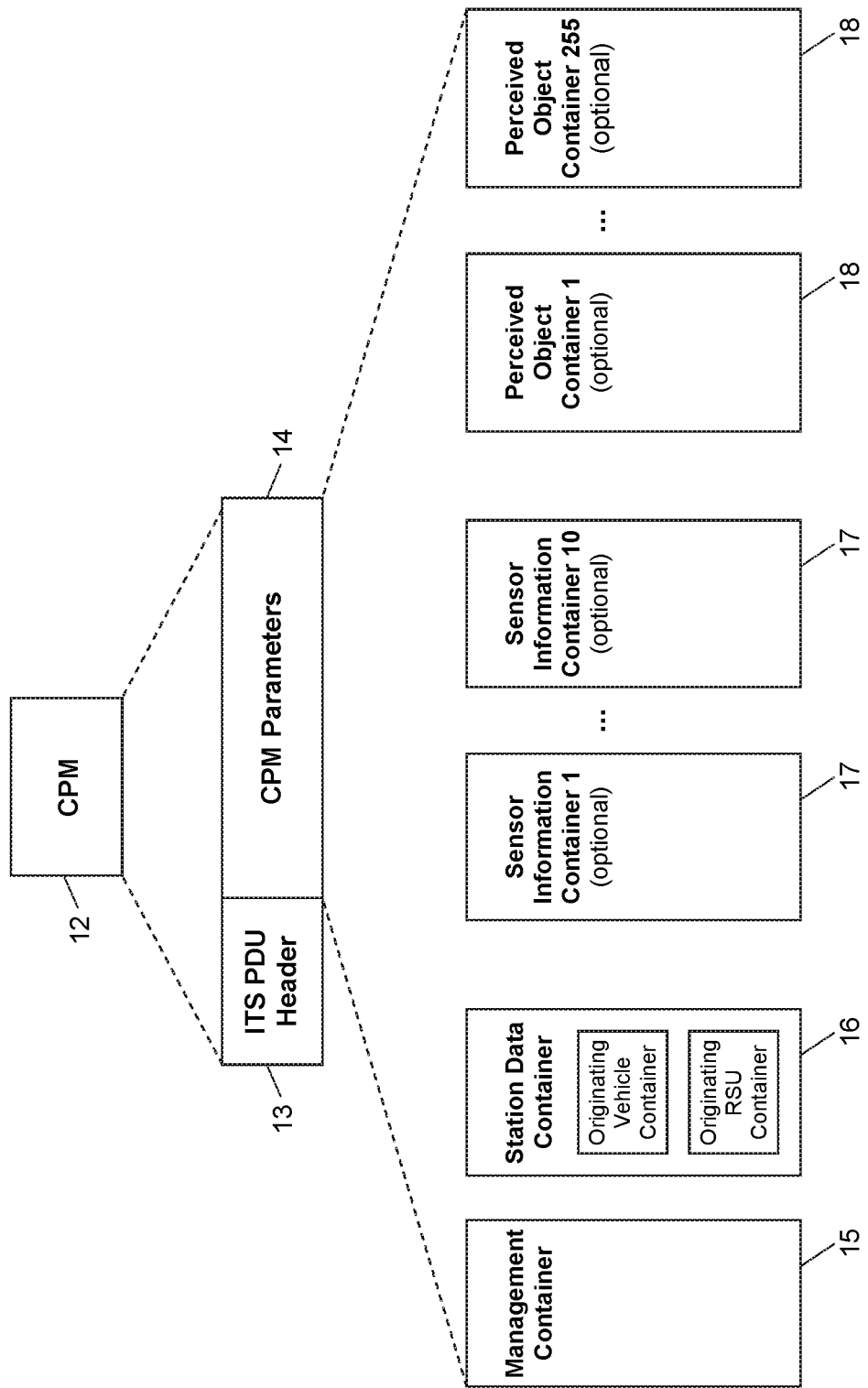

The messages exchanged in the CPS to share such perceptions of objects and/or free space areas to inform the communication partner about, e.g., the existence, speed, distance, position, direction etc. of a perceived object or the existence, position, shape, size etc. of a perceived free space area are called Collective Perception Messages (CPMs). FIG. 2 shows the general structure of a CPM as defined in ETSI TR 103 562. The CPM 12 contains—apart from an ITS PDU (Protocol Data Unit) header 13 designating the message as a "CPM package"—a set of CPM parameters 14 in the form of one or more data containers 15-18, in particular:
- a management container 15 containing basic information about the transmitting ITS-S (in the example of FIG. 1: the vehicle 6), such as the station's type (e.g., OBU or RSU) and the station's absolute position;
- a station data container 16 with further details, such as the dynamic state or map references of the transmitting ITS-S;
- none, one or more sensor information containers 17 describing the sensory capabilities of the transmitting ITS-S, such as range, aperture and position of the sensor/s; and
- none, one or more perceived object containers 18 containing detailed information about the perceived objects. Each perceived object is assigned a local object identifier by the ITS-S generating the CPM which remains constant as long as the object is detected and tracked by the ITS-S.

Information about perceived free space areas may be transported in either one or more of the sensor information containers 17 or one or more of the perceived object containers 18, depending on the implementation of the ETSI TR 103 562 standard.

In particular, according to ETSI TR 103 562 a perceived object container 18 may contain sensor data such as distance and direction or position, shape and size of a perceived free space area as measured by the ITS-S's sensor, and an indication of the time of measurement of the sensor data. For some data elements, e.g., for distance, speed, angle and object dimension values of a perceived object or for the existence of a free space area, ETSI TR 103 562 also provides for confidence measures of the respective data values. The receiving ITS-S can then assess the trustworthiness of the collectively shared perception information.

In general, it is up to the receiving ITS-S to make good use of the wealth of collectively shared sensor data to appropriately execute road safety applications, such as driver warnings or automatic braking and steering functions for moving into a free space area for collision avoidance. However, the wealth of information can overload the processing capabilities of receiving ITS-S in heavy traffic situations, leading either to malfunctions or the need for higher processing powers with increased costs.

BRIEF SUMMARY

It is an object of the disclosed subject matter to overcome the shortcomings of the prior art and to provide novel devices for improving CPS in ITS.

To this end, the disclosed subject matter creates a novel ITS service station, comprising:
a receiver having an area of radio coverage and being configured to receive a first Collective Perception Message, CPM, from a first ITS station at a first position within the coverage area, the first CPM including first sensor data on at least one first free space area perceived by the first ITS station;
an aggregator connected to the receiver and configured to aggregate said first sensor data with at least one second sensor data on at least one second free space area into a third sensor data, which second sensor data either is received via the receiver in a second CPM from a second ITS station at a second position within the coverage area or is determined by a sensor of the ITS service station; and
a transmitter connected to the aggregator and configured to broadcast said third sensor data in a third CPM.

The novel ITS service station of the disclosed subject matter aggregates CPMs from surrounding ITS-S into aggregated ("third") CPMs so that other ITS-S listening to these broadcasts are eased from the burden of following a multitude of ITS-S and processing a multitude of CPMs to assess free maneuvering space. The ITS service station of the disclosed subject matter therefore contributes to reduce the complexity of the CPS for listening ITS-S, in particular when the aggregated CPMs of the ITS service station are prioritized over "normal" CPMs during communication or receipt. Listening ITS-S can thus gain a better overview about any possible free space areas in their vicinity without the need to fuse free space area information from a multitude of CPMs themselves.

An embodiment of the disclosed subject matter is characterized in that the first sensor data includes a first confidence measure of said first free space area and the at least one second sensor data includes a second confidence measure of said second free space area, wherein the aggregator is configured to calculate a third confidence measure from said first and at least one second confidence measures and to include said third confidence measure in the third sensor data.

An aggregated ("third") data in the aggregated ("third") CPM may have a better aggregated ("third") confidence measure when it had been aggregated from multiple data sources. Therefore, any ITS-S listening to both "normal" CPMs (here: the first and second CPMs) and "aggregated" CPMs (here: the "third" CPM of the disclosed ITS service station) can choose to process and consider the CPM showing the best confidence measure for a specific maneuvering space needed, leading to an implicit prioritizing of the CPMs of the ITS service station at the receiving ITS-S. The receiving ITS-S may ignore sensor data regarding the maneuvering space from other CPMs in favor of the sensor data in the aggregated CPM. Processing load in the receiving ITS-S is thus significantly reduced, in particular in heavy traffic situations, e.g., at an intersection, and low-cost ITS-S with modest processing capabilities can be used without compromising safety.

In one embodiment, the aggregator is configured to aggregate said first and second sensor data by geometrically intersecting the first and second free space areas indicated therein and by including the resulting intersection area in the third sensor data. The area of intersection is thus an area which is confirmed by at least two disseminating ITS-S as being "free", i.e., unoccupied by another vehicle or object. This double confirmation increases the trustworthiness of the aggregated CPM on free space area information. Furthermore, if the aggregated (third) CPM contains a (third) confidence measure for the (third) sensor data on the intersection area, then this third confidence measure can be chosen as equal to or better than the better one of the first and second confidence measures of the first and second free space areas which had been intersected. A listening ITS-S can then use the intersection area with high confidence that it is empty.

Alternatively the aggregator is configured to aggregate said first and second sensor data by geometrically merging the first and second free space areas indicated therein and including the resulting merged area in the third sensor data. In this embodiment, the listening ITS-S has a large merged area of free space available for maneuvering, albeit of lower confidence. In particular, if confidence measures are used in the first, second and third CPMs, the third confidence measure in the aggregated CPM can be set to the worst confidence measure of all first and second free space areas from which the merged area had been built, to be on the safe side.

The third sensor data may additionally include the number (count) of first and second sensor data from which the third sensor data has been aggregated, and/or may additionally include the number (count) of first and second ITS-S from whose CPMs the third sensor data has been aggregated. An ITS-S receiving the aggregated CPM can use this information to further assess the confidence of a sensor data indicated therein.

For keeping inventory and tracking of objects in its area of coverage over time, the aggregator of the ITS service station may have a memory for storing first and second CPMs including timestamps of the sensor data therein and may be configured to retrieve, for aggregating said third CPM, all sensor data from the memory having timestamps falling within a selected period of time.

Although the aggregated CPMs of the ITS service station of the disclosed subject matter may implicitly have priority over "normal" CPMs in that they will usually carry sensor data with higher confidence measures than the normal CPMs of other ITS-S, the aggregated CPMs of the ITS service station may additionally be flagged with a higher priority than normal CPMs. This may be done by, e.g., including a "high priority" flag in the header of the aggregated CPM. Receiving ITS-S then do not need to compare confidence measures to prioritize aggregated CPM over normal CPMs, but just will look for the high priority flag, to speed up processing.

The ITS service station of the disclosed subject matter can either be moveable, e.g., in the form of an onboard unit on a vehicle, or stationary, such as a roadside unit or infrastructure. In one embodiment the ITS service station is a roadside unit at an intersection. At intersections high vehicle traffic and hence communication traffic is to be expected so that receiving ITS-S benefit most from the load-reducing and safety-increasing CPM aggregation service of the disclosed ITS service station.

BRIEF DESCRIPTION OF THE DRAWINGS/FIGURES

Figure 3A:
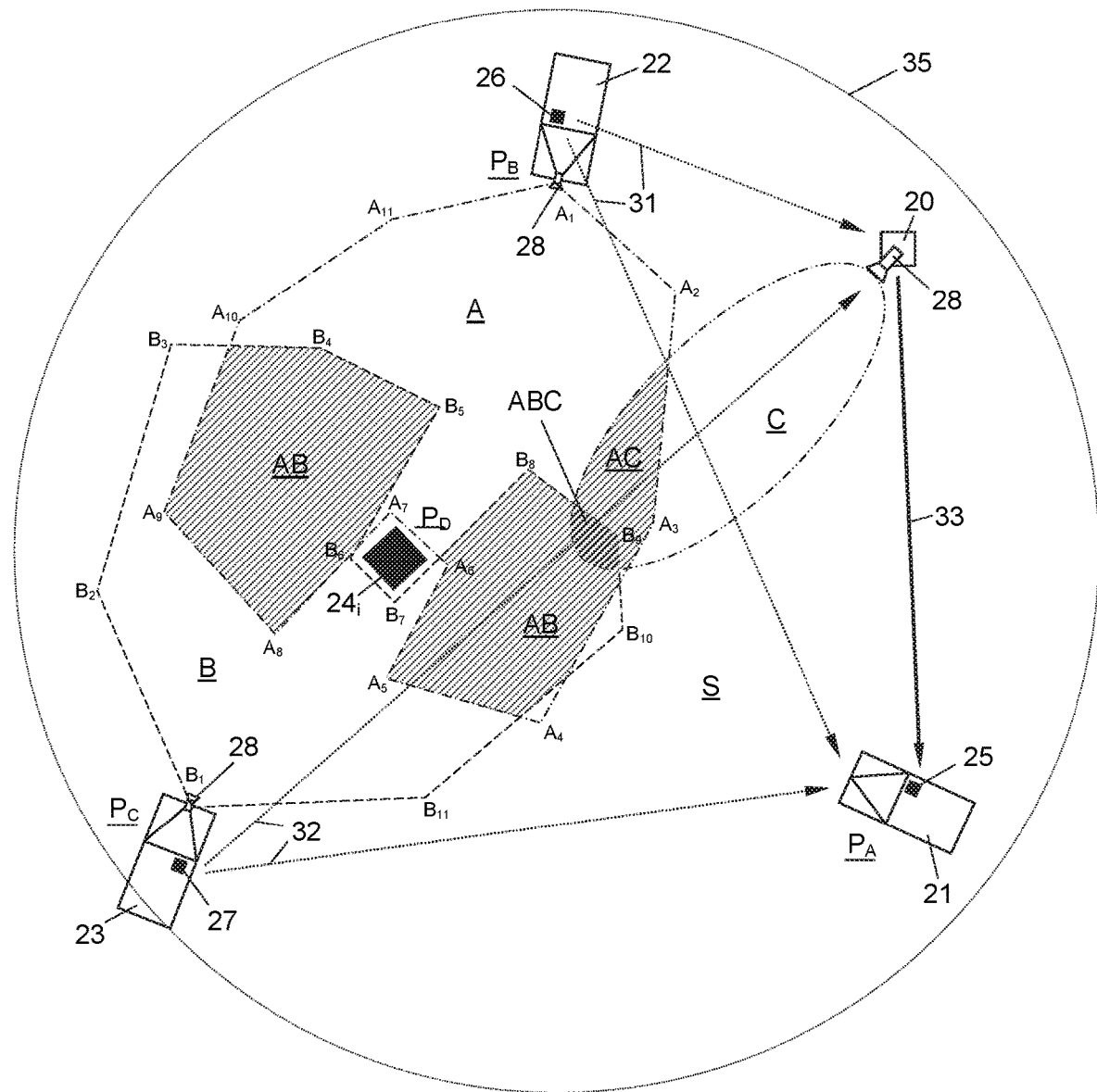
Figure 3B:
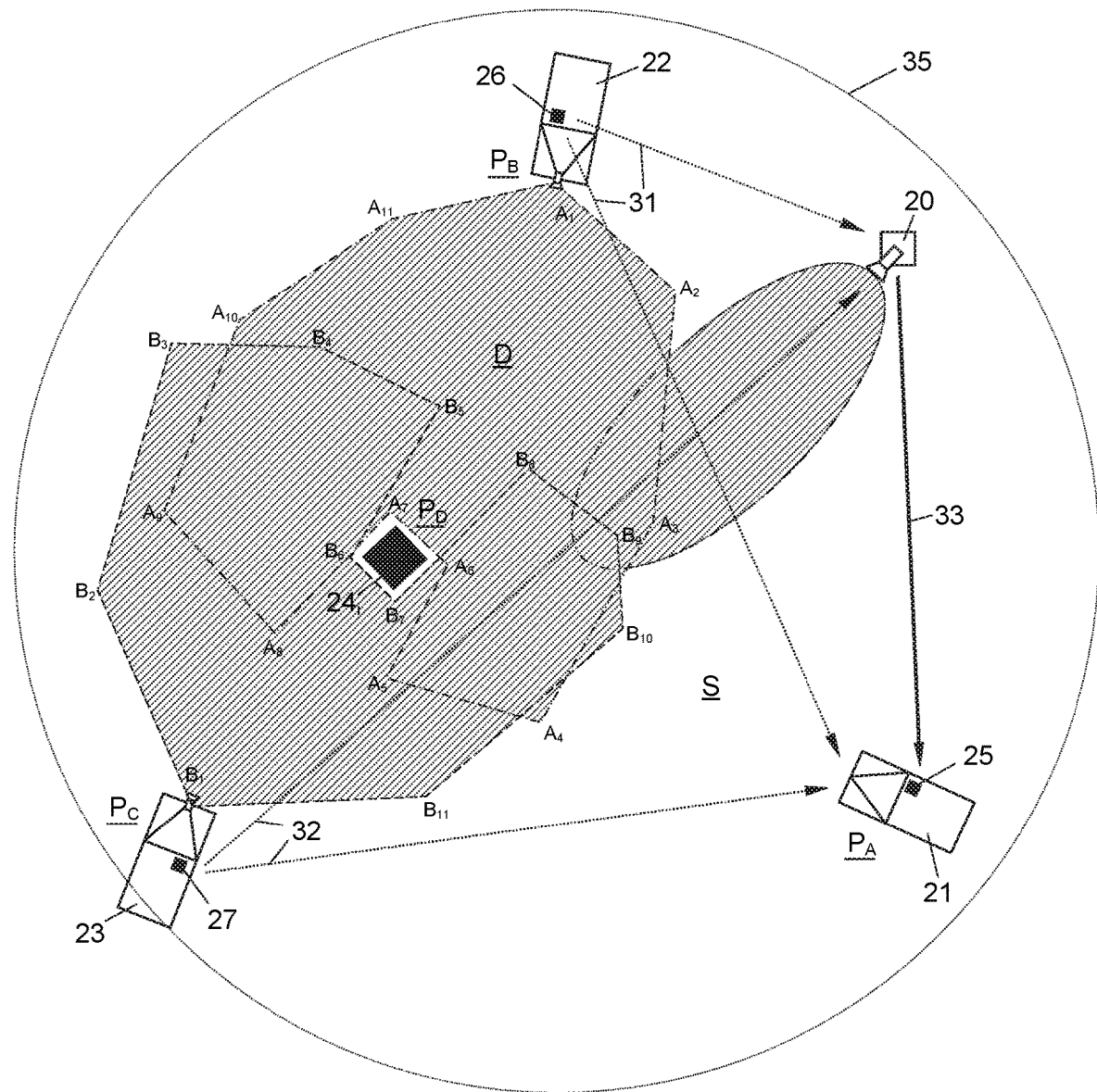
Figure 4:
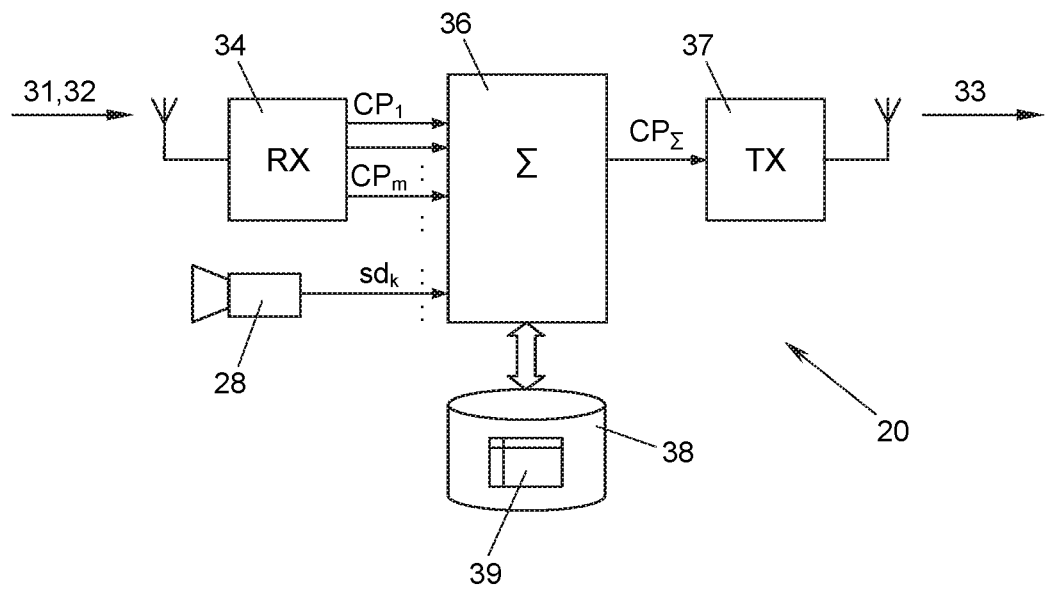
Figure 5A:
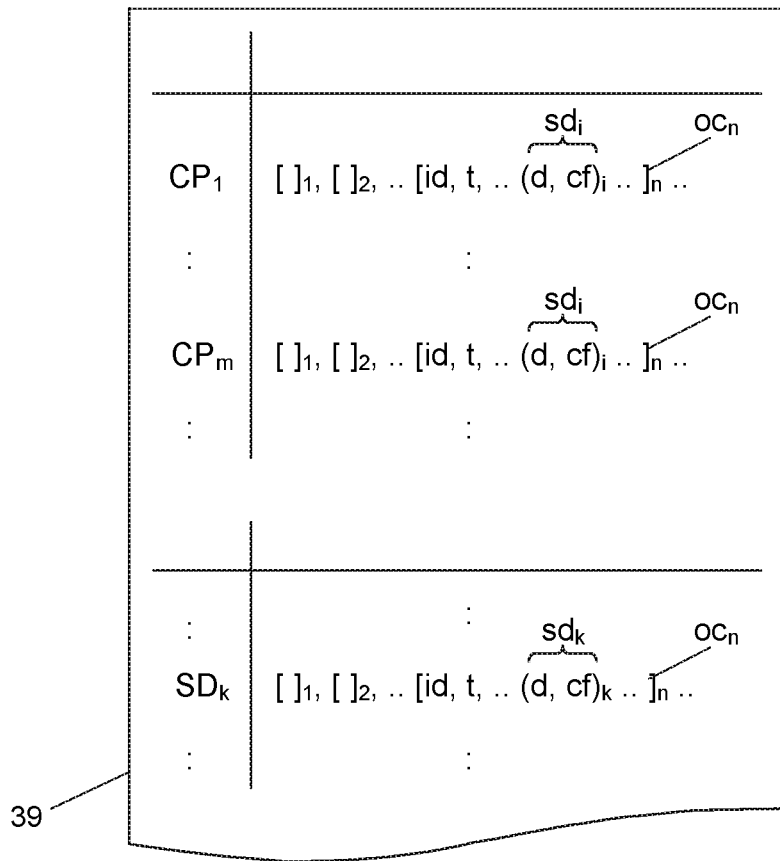

The disclosed subject matter will now be described in further detail by means of exemplary embodiments thereof under reference to the enclosed drawings, in which show:

FIGS. 1a-1c the basic concept of Collective Perception in ITS according to the state of the art in three plan views of an exemplary road section;

FIG. 2 a data structure of a CPM according to the state of the art;

FIGS. 3a and 3b two different embodiments of an ITS service station according to the disclosed subject matter in a plan view each;

FIG. 4 an ITS service station according to the disclosed subject matter in a block diagram;

FIG. 5a an exemplary memory contents of the ITS service station of FIG. 4; and

Figure 5B:
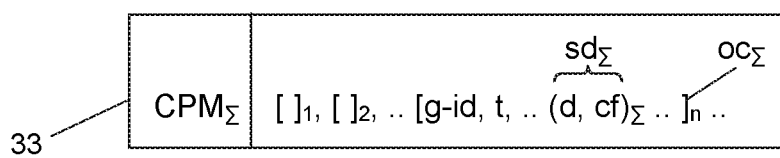

FIG. 5b an example of an aggregated CPM as broadcast by the ITS service station of FIG. 4.

DETAILED DESCRIPTION

The FIGS. 1 and 2 referring to the CPS in ITS and the CPM data structure, respectively, have been explained at outset.

FIGS. 3a and 3b each show an ITS service station 20 mounted stationarily as a roadside unit (RSU) at a traffic area S, e.g., an intersection, a highway, a parking lot etc. Three exemplary vehicles 21-23 are shown approaching or just about to enter the traffic area S. The positions of the vehicles 21-23 on the area S are designated as PA, PB and Pc, respectively.

The vehicles 21-23 each carry an ITS-S 25-27 in the form of an onboard unit (OBU). Vehicles 22, 23 are exemplarily equipped with a sensor 28 with a respective field of view, capable of perceiving an object $24_i$ (i=1, 2, ...). The sensors 28 may be of any kind, e.g., a camera, a radar or lidar sensor, an acoustic sensor, a vibration sensor, an infrared sensor etc. The ITS service station 20, too, may have an own sensor 28 to perceive objects $24_i$ in its vicinity, although this is not obligatory. Generally speaking, each of the ITS-S 25-27 and ITS service station 20 may have none, one or more sensors 28, also of different sensor types.

Instead of being stationarily mounted as a roadside unit, the ITS service station 20 could also be mobile, e.g., aboard a vehicle as an OBU.

The objects $24_i$ perceived by the sensors 28 may be of any kind, e.g., a manned or unmanned land, sea or air vehicle, a pedestrian, an animal, a machine, a traffic sign, a radio, a light or infrared beacon, and the like.

In the scenarios depicted in FIGS. 3a and 3b each of the ITS-S 26, 27 of the vehicles 22, 23 perceives the same exemplarily depicted object $24_i$. At the same time, within their respective fields of views of the sensors 28, the ITS-S 26, 27 each perceive a free space area A, B which is devoid of any object $24_i$. Also the sensor 28 of the ITS service station 20 perceives a free space area C devoid of any object $24_i$.

The free space areas A, B, C perceived by the stations 26, 27, 20 will have a shape and size depending on the field of view of the respective sensor 28 and the objects $24_i$ perceived therein as well as the shadow each object $24_i$ casts within that field of view for the respective sensor 28.

The vehicles 22, 23 share their perceptions of the observed free space areas A, B, as detected by their sensors 28, via CPMs 31, 32 sent from their ITS-S 26, 27 (the "perceiving" or "disseminating" ITS-S) to the ITS-S 25 (the "receiving" or "listening" ITS-S) of the vehicle 21. These "normal" CPMs 31, 32 are also received by the ITS service station 20, which creates an "aggregated" CPM 33 therefrom, as follows.

Within the CPMs 31, 32 a perceived free space area A, B can be indicated in any possible geometric definition, e.g., as a circle, square, rectangle, sector, ellipse or polygon. For example, the free space areas A, B are defined by the corner points $A_1$-$A_{11}$ and $B_1$-$B_{11}$, respectively. The exemplary free space area C observed by the ITS service station 20 is defined by an ellipse.

With reference to FIGS. 3a, 3b and 4, the ITS service station 20 has a receiver 34 with an area of radio coverage 35 to receive the CPMs 31, 32 from the ITS-S 26, 27 in its neighborhood. It goes without saying that the radio coverage area 35 will be dependent both on the transmitting power of the disseminating ITS-S 26, 27 and the receiving sensitivity of the receiver 34. For ease of description, the various normal CPMs 31, 32 ... are designated as $CP_1$, $CP_2$, ..., generally $CP_m$ in the following.

An aggregator 36 connected to the receiver 34 processes the set $\{CP_m\}$ of the received CPMs $CP_m$ and calculates the aggregated CPM 33, called $CP_\Sigma$ in the following, therefrom. The aggregated CPM $CP_\Sigma$ is then broadcast by a transmitter 37 connected to the output of the aggregator 36 so that it can be received by listening ITS-S in the vicinity, such as (here) the ITS-S 25 on the vehicle 21. The transmitter 37 and the receiver 34 of the ITS service station 20 can be implemented by a combined transceiver, too.

To calculate the aggregated CPM $CP_\Sigma$ from the received normal CPMs $CP_m$ the aggregator 36 has a memory 38 which contains—among other programs and data as needed—a table 39 storing the CPMs $CP_m$, shown in FIG. 5a.

With reference to FIGS. 2 and 5a a CPM 12, 31, 32 or $CP_m$, respectively, contains—apart from the other data depicted in FIG. 2—in any sensor information container 17 or, optionally, in any perceived object container 18, here called $oc_1$, $oc_2$, ..., generally $oc_n$, one or more sensor data $sd_i$ (i=1, 2, ...) on free space areas like the free space areas A, B, C, ..., and optionally corresponding free space area identifiers id, usually assigned by the perceiving ITS-S 26, 27.

The sensor data $sd_i$ on any free space A, B, C ... perceived by a disseminating ITS-S 26, 27 may define the respective free space area in any form of geometrical definition $d_i$, e.g., a distance, direction and orientation of the free space area to the sensor 28, a geo-referenced or map-matched region, one or more dimensions of the free space area, a shape and size of the free space area, e.g., in form of a set of polygon corner coordinates $A_1$-$A_{11}$, $B_1$-$B_{11}$ etc., as determined by the sensor 28, e.g., as taken by a camera and determined by image processing, etc. For example, any of the data items in the perceived object container 18 of a CPM according to ETSI TR 103 562 can be used for transporting the sensor data definition $d_i$ on a free space area A, B, C, ..., e.g., the data element "FreeSpaceArea" of ETSI TR 103 562.

Some of the sensor data $sd_i$ which are provided by the respective sensor 28 or a suitable processor connected to the sensor/s 28 in the ITS-S 26, 27 or the ITS service station 20 may be provided with a confidence measure $cf_i$, e.g., in form of the "FreeSpaceConfidence" data element according to ETSI TR 103 562. Then the sensor data $sd_i$ is a pair $(d, cf)_i$ comprised of the free space area geometrical definition $d_i$ and the associated free space area confidence measure $cf_i$.

The confidence measure $cf_i$ of a free space area A, B, C, ..., or of its definition $d_i$, respectively, may be any statistical measure of the confidence, reliability, trustworthiness, non-error rate etc. of this free space area to be actually empty of objects $24_i$. For example, the confidence measure $cf_i$ can be the 95%-confidence interval, i.e., that with a probability of 95% the free space area with the definition $d_i$ is empty. Of course, other measures of confidence could be used as explained later on.

If the ITS service station 20 has one or more own sensors 28 which generate their own sensor data $sd_k$ (k=1, 2, ...), the output of these sensors 28 can, e.g., be stored—in the same format as the received CPMs $CP_m$—in data records $SD_1$, $SD_2$, ..., generally $SD_k$, for example in the same table 39, as shown in FIG. 5a.

From at least two received CPMs $CP_m$, or at least one received CPM $CP_m$ and at least one sensor data record $SD_k$, the aggregator 36 calculates the aggregated CPM $CP_\Sigma$ as follows.

With reference to FIGS. 3a, 3b and 5b, there are basically two possibilities to aggregate free space areas A, B, C, ... from at least two different CPMs $CP_m$ or at least one CPM $CP_m$ and at least one record $SD_k$ into an aggregated sensor data $sd_\Sigma$ which is to be included in the aggregated CPM $CP_\Sigma$. As shown in FIG. 3a, two or more free space area definitions $d_i$, $d_k$ can be geometrically intersected, see the resulting intersection area AB of the geometric intersection of the free space areas A and B, the resulting intersection area AC of the geometric intersection of the free space areas A and C, and the resulting intersection area ABC of the geometric intersection of all three free space areas A, B, C. The more free space areas are intersected, the better the confidence or trustworthiness of a resulting (intersected) free space area AB, AC, ABC is, since more participating stations 26, 27, 20 indicate that the intersection area is actually devoid of any objects $24_i$. In the aggregated CPM $CP_\Sigma$ one, more or all of the determined intersection areas AB, AC, ABC can be indicated by respective geometric definitions $d_\Sigma$.

An alternative possibility to calculate the aggregated CPM $CP_\Sigma$ is shown in FIG. 3b. The aggregated sensor data $sd_\Sigma$ can be a geometrical merger, combination or fusion D of all individual free space areas A, B, C, indicating for the listening ITS-S 25 the maximum area of reported free space which can be used for maneuvering without collision with any object $24_i$. Of course, the confidence of the trustworthiness of this resulting merged area D will usually not be better than the worst confidence of any of the individual free space areas A, B, C.

Therefore, if free space area definitions $d_i$, $d_k$ with respective confidence measures $cf_i$, $cf_k$ are used in the aggregation, the aggregated confidence measure $cf_\Sigma$ of the aggregated area AB, AC, ABC, D in the aggregated sensor data $sd_\Sigma$ with the geometrical definition $d_\Sigma$ may be

- in case of an intersection (AB, AC, ABC): either equal to or better than the best one of the individual confidence measures $cf_i$, $cf_k$ of the originating areas A, B, C, or
- in case of a merged area D: equal to the worst one of the individual confidence measures $cf_i$, $cf_k$ of the originating areas A, B, C.

The aggregated confidence measure $cf_\Sigma$ can also be a composite field or concatenation of the confidence measure $cf_\Sigma$ as calculated above and other information such as the number (count) of data sources responsible for that confidence measure $cf_\Sigma$, their positions, speeds and/or headings with respect to the free space areas A, B, C, . . . , the fields of view of the respective sensors 28, etc. For example, the more different the positions of the data sources, i.e. the positions of the sensors 28 and/or the positions of the stations 20, 26, 27, with respect to an intersected free space area AB, AC, ABC are, the better the data quality and hence trustworthiness of that intersected free space area is.

The aggregation performed by the aggregator 36 may take into account timing aspects. Each CPM $CP_m$ and record $SD_k$, and in particular each perceived object container $oc_n$ or even each individual sensor data $sd_i$, $sd_k$, may contain a time-stamp t indicative of the time of measurement of the respective sensor data $sd_i$, $sd_k$. The timestamp t may be indicated in any suitable format, be it relatively to a time of sending the respective $CP_m$ or the time of storing the respective record $SD_k$, or absolutely in terms of a system-wide reference clock.

The timestamps t can also take into account the track or estimated movement of a perceived object $24_i$ and the sensor shadow it casts in the respective sensor's field of view, i.e., its influence on the respective perceived free space areas A, B, C, . . . , as well as possible calculation, processing or transmission delays. In this way, the "age" of a sensor data $sd_i$, $sk_k$ can be accounted for by the aggregator 36 when calculating the aggregated CPM $CP_\Sigma$. For example, the aggregator 36 may, when aggregating the CPM $CP_\Sigma$, only use sensor data $sd_i$, $sd_k$ from its memory 38 whose timestamps t fall within a selected period of time, for example into a past cycle interval, when the ITS service station 20 cyclically sends CPMs $CP_\Sigma$.

In the aggregated CPM $CP_\Sigma$ the aggregator 36 may optionally include the number (count) of originating sensor data $sd_i$, $sd_k$ from which a specific aggregated sensor data $sd_\Sigma$ had been aggregated, and/or the number (count) of disseminating ITS-S 26, 27 from whose CPMs $CP_m$ that specific aggregated sensor data $sd_\Sigma$ had been aggregated. The numbers (counts) can be, e.g., attached as data fields to the respective aggregated confidence value/s $cf_\Sigma$ in the aggregated CPM $CP_\Sigma$. These numbers (counts) can then be used by a receiving ITS-S 25 to select if or which one of several received aggregated CPM $CP_\Sigma$ is to trust most regarding a specific sensor data.

Usually, the receiving ITS station 25 will select and use that aggregated sensor data $sd_\Sigma$ which has the best confidence measure $cf_\Sigma$ attributed to it, e.g., the smallest confidence interval or the highest confidence level, when the confidence measure is expressed in such terms. However, with the additional knowledge of the numbers (counts) of originating sensor data or ITS-S, from which the sensor data $sd_\Sigma$ had been aggregated, the receiving ITS-S 25 can improve the selection, e.g., by weighting the confidence measures $cf_\Sigma$ by their respective numbers (counts) of underlying data. On the other hand, said numbers (counts) may be particularly useful for sensor data $sd_\Sigma$ which does not comprise a confidence measure $cf_\Sigma$ at all.

The aggregated CPMs $CP_\Sigma$ broadcast by the ITS service station 20 as CPMs 33 may optionally contain a "high priority" flag or a flag indicating a priority which is higher than those of the "normal" CPMs $CP_m$ (CPMs 31, 32). ITS-S 24 listening to the CPMs 31, 32 may prefer CPMs 33 with higher priority (or disregard CPMs 31, 32 with lower priority) so that the aggregated CPMs 33 of the ITS service station 20 are favored.

CONCLUSION

The disclosed subject matter is not restricted to the specific embodiments disclosed herein, but encompasses all modifications, variants and combinations thereof that fall within the scope of the appended claims.

What is claimed is:

1. An Intelligent Transportation System (ITS) service station, comprising:
   a receiver having an area of radio coverage and being configured to receive a first Collective Perception Message (CPM) from a first ITS station at a first position within the coverage area, the first CPM including first sensor data on at least one first free space area perceived by the first ITS station;
   an aggregator connected to the receiver and configured to aggregate said first sensor data with at least one second sensor data on at least one second free space area into a third sensor data, which second sensor data either is received via the receiver in a second CPM from a second ITS station at a second position within the coverage area or is determined by a sensor of the ITS service station; and
   a transmitter connected to the aggregator and configured to broadcast said third sensor data in a third CPM;
   wherein the third sensor data includes a count of first and second sensor data from which the third sensor data has been aggregated.

2. The ITS service station according to claim 1, wherein the first sensor data includes a first confidence measure of said first free space area and the at least one second sensor data includes a second confidence measure of said second free space area, wherein the aggregator is configured to calculate a third confidence measure from said first and at least one second confidence measures and to include said third confidence measure in the third sensor data.

3. The ITS service station according to claim 1, wherein the aggregator is configured to aggregate said first and second sensor data by geometrically intersecting the first and second free space areas indicated therein and by including the resulting intersection area in the third sensor data.

4. The ITS service station according to claim 1, wherein the aggregator is configured to aggregate said first and second sensor data by geometrically merging the first and second free space areas indicated therein and by including the resulting merged area in the third sensor data.

5. An Intelligent Transportation System (ITS) service station, comprising:
a receiver having an area of radio coverage and being configured to receive a first Collective Perception Message (CPM) from a first ITS station at a first position within the coverage area, the first CPM including first sensor data on at least one first free space area perceived by the first ITS station;
an aggregator connected to the receiver and configured to aggregate said first sensor data with at least one second sensor data on at least one second free space area into a third sensor data, which second sensor data either is received via the receiver in a second CPM from a second ITS station at a second position within the coverage area or is determined by a sensor of the ITS service station; and
a transmitter connected to the aggregator and configured to broadcast said third sensor data in a third CPM;
wherein the third sensor data includes a count of first and second ITS stations from whose CPMs the third sensor data has been aggregated.

6. An Intelligent Transportation System (ITS) service station, comprising:
a receiver having an area of radio coverage and being configured to receive a first Collective Perception Message (CPM) from a first ITS station at a first position within the coverage area, the first CPM including first sensor data on at least one first free space area perceived by the first ITS station;
an aggregator connected to the receiver and configured to aggregate said first sensor data with at least one second sensor data on at least one second free space area into a third sensor data, which second sensor data either is received via the receiver in a second CPM from a second ITS station at a second position within the coverage area or is determined by a sensor of the ITS service station; and
a transmitter connected to the aggregator and configured to broadcast said third sensor data in a third CPM;
wherein the aggregator has a memory for storing first and second CPMs including timestamps of the sensor data therein and is configured to retrieve, for aggregating said third CPM, all sensor data from the memory having timestamps falling within a selected period of time.

7. An Intelligent Transportation System (ITS) service station, comprising:
a receiver having an area of radio coverage and being configured to receive a first Collective Perception Message (CPM) from a first ITS station at a first position within the coverage area, the first CPM including first sensor data on at least one first free space area perceived by the first ITS station;
an aggregator connected to the receiver and configured to aggregate said first sensor data with at least one second sensor data on at least one second free space area into a third sensor data, which second sensor data either is received via the receiver in a second CPM from a second ITS station at a second position within the coverage area or is determined by a sensor of the ITS service station; and
a transmitter connected to the aggregator and configured to broadcast said third sensor data in a third CPM;
wherein the third CPM is flagged with a higher priority than the first and second CPMs.

8. The ITS service station according to claim 1, wherein the ITS service station is a roadside unit.

9. The ITS service station according to claim 5, wherein the first sensor data includes a first confidence measure of said first free space area and the at least one second sensor data includes a second confidence measure of said second free space area, wherein the aggregator is configured to calculate a third confidence measure from said first and at least one second confidence measures and to include said third confidence measure in the third sensor data.

10. The ITS service station according to claim 5, wherein the aggregator is configured to aggregate said first and second sensor data by geometrically intersecting the first and second free space areas indicated therein and by including the resulting intersection area in the third sensor data.

11. The ITS service station according to claim 5, wherein the aggregator is configured to aggregate said first and second sensor data by geometrically merging the first and second free space areas indicated therein and by including the resulting merged area in the third sensor data.

12. The ITS service station according to claim 5, wherein the ITS service station is a roadside unit.

13. The ITS service station according to claim 6, wherein the first sensor data includes a first confidence measure of said first free space area and the at least one second sensor data includes a second confidence measure of said second free space area, wherein the aggregator is configured to calculate a third confidence measure from said first and at least one second confidence measures and to include said third confidence measure in the third sensor data.

14. The ITS service station according to claim 6, wherein the aggregator is configured to aggregate said first and second sensor data by geometrically intersecting the first and second free space areas indicated therein and by including the resulting intersection area in the third sensor data.

15. The ITS service station according to claim 6, wherein the aggregator is configured to aggregate said first and second sensor data by geometrically merging the first and second free space areas indicated therein and by including the resulting merged area in the third sensor data.

16. The ITS service station according to claim 6, wherein the ITS service station is a roadside unit.

17. The ITS service station according to claim 7, wherein the first sensor data includes a first confidence measure of said first free space area and the at least one second sensor data includes a second confidence measure of said second free space area, wherein the aggregator is configured to calculate a third confidence measure from said first and at least one second confidence measures and to include said third confidence measure in the third sensor data.

18. The ITS service station according to claim 7, wherein the aggregator is configured to aggregate said first and second sensor data by geometrically intersecting the first and second free space areas indicated therein and by including the resulting intersection area in the third sensor data.

19. The ITS service station according to claim 7, wherein the aggregator is configured to aggregate said first and second sensor data by geometrically merging the first and second free space areas indicated therein and by including the resulting merged area in the third sensor data.

20. The ITS service station according to claim 7, wherein the ITS service station is a roadside unit.

* * * * *